United States Patent
Abrol et al.

(10) Patent No.: US 6,631,278 B2
(45) Date of Patent: *Oct. 7, 2003

(54) METHOD FOR ORIGINATING PACKET DATA CALLS VIA DIAL-UP NETWORKING APPLICATIONS

(75) Inventors: Nischal Abrol, San Diego, CA (US); Marcello Lioy, San Diego, CA (US); James J. Willkie, Poway, CA (US)

(73) Assignee: Qualcomm Inc., San Diego, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 09/785,838

(22) Filed: Feb. 16, 2001

(65) Prior Publication Data

US 2002/0115475 A1 Aug. 22, 2002

(51) Int. Cl.[7] ................................. H04B 1/38
(52) U.S. Cl. ............ 455/564; 455/414; 455/556; 455/565; 455/90; 379/442; 379/456
(58) Field of Search ............... 455/564, 414, 455/556, 565, 90, 466, 550, 575; 379/442, 456; 370/338, 468

(56) References Cited

U.S. PATENT DOCUMENTS

| 6,192,041 B1 | 2/2001 | Phillips |
| 6,370,399 B1 | 4/2002 | Phillips |

FOREIGN PATENT DOCUMENTS

| WO | 0004691 | 1/2000 |
| WO | 0124556 | 4/2001 |

*Primary Examiner*—Nay Maung
*Assistant Examiner*—Alan T. Gantt
(74) *Attorney, Agent, or Firm*—Nicholas Palley; Charles Brown; Philip Wadsworth

(57) ABSTRACT

A system and method for selecting from a plurality of data service options in a wireless communication network is presented. The system includes a terminal device for originating a call and for transmitting and receiving data in accordance with a selected data service option. The terminal device includes a dialing interface for inputting a sequence of one or more symbols representing a dial command string for originating the call. The input symbol sequence includes information indicating the selection of a data service option. The system also includes a communication device, coupled to the terminal device, for receiving the dial command string from the terminal device, for storing a plurality of predetermined symbol sequences including standard telephone numbers and reserved telephone number sequences representing different data service options, and for comparing the contents of the dial command string with the stored predetermined symbol sequences. The communications device operates in accordance with the selected data service option when the communication device determines that the contents of the dial command string matches one of the reserved telephone number sequences.

12 Claims, 3 Drawing Sheets

METHOD FOR ORIGINATING PACKET DATA CALLS VIA DIAL-UP NETWORKING APPLICATIONS

BACKGROUND OF THE INVENTION

1. Field of the Invention

This invention generally relates to the field of wireless communications. More particularly, the present invention relates to a novel method for originating packet data service option calls via dial-up networking applications.

2. Description of Related Art

Recent innovations in wireless communication and computer-related technologies, as well as the unprecedented growth of Internet subscribers, have paved the way for mobile computing. In fact, the popularity of mobile computing has placed greater demands on the current communications infrastructure to provide mobile users with more support. A crucial part of meeting these demands and providing users with the necessary support is the use of Code Division Multiple Access (CDMA) technology in wireless communication systems.

CDMA is a digital radio-frequency (RF) channelization technique that is defined in the Telecommunications Industry Association/Electronics Industries Association Interim Standard-95 (TIA/EIA IS-95), entitled "MOBILE STATION-BASE STATION COMPATIBILITY STANDARD FOR DUAL-MODE WIDEBAND SPREAD SPECTRUM CELLULAR SYSTEM", published in July 1993 and herein incorporated by reference. Wireless communication systems employing this technology assign a unique code to communication signals and spread these communication signals across a common wideband spread spectrum bandwidth. As long as the receiving apparatus in a CDMA system has the correct code, it can successfully detect and select its communication signal from the other signals concurrently transmitted over the same bandwidth. The use of CDMA produces an increase in system traffic capacity, improves overall call quality and noise reduction, and provides a reliable transport mechanism for data service traffic.

FIG. 1 illustrates a simplified block diagram of such a wireless data communication system 100. System 100 allows a mobile terminal equipment, TE2 device 102 (e.g., the terminal equipment such as laptop or palmtop computer) to communicate with an Interworking Function (IWF) 108. System 100 includes a wireless communication device, MT2 device 104 (e.g., wireless telephone), and a Base Station/Mobile Switching Center (BS/MSC) 106. The IWF 108 serves as a gateway between the wireless network and other networks, such as the Public Switched Telephone Network (PSTN) and wireline packet data networks providing Internet- or Intranet-based access. An L interface couples IWF 108 to BS/MSC 106. Often the IWF 108 will be co-located with the BS/MSC 106. The TE2 device 102 is electronically coupled to the MT2 device 104 via the $R_m$ interface. The MT2 device 104 communicates with the BS/MSC 106 via the wireless interface $U_m$. The TE2 device 102 and the MT2 device 104 may be integrated into a single unit or may be separated out, as in the case of an installed mobile phone unit in which a laptop is the TE2 device 102 and the transceiver is the MT2 device 104. It is important to note that, as indicated by FIG. 2, the combination of the TE2 device 102 and the MT2 device 104, whether integrated or separate, is generally referred to as a mobile station (MS) 103.

The ability of CDMA systems to accommodate data service traffic has been defined in the TIA/EIA IS-707.5 standard, entitled "DATA SERVICE OPTIONS FOR WIDEBAND SPREAD SPECTRUM SYSTEMS: PACKET DATA SERVICES," published in February 1998 and herein incorporated by reference. Similarly, the TIA/EIA IS-707-A.5 standard, entitled "DATA SERVICE OPTIONS FOR SPREAD SPECTRUM SYSTEMS: PACKET DATA SERVICES," and the TIA/EIA IS-707-A.9 standard, entitled "DATA SERVICE OPTIONS FOR SPREAD SPECTRUM SYSTEMS: HIGH-SPEED PACKET DATA SERVICES," both published in March 1999 and incorporated by reference, also define requirements for packet data transmission support on TIA/EIA IS-95 systems. In addition, new standards such as TIA/EIA IS-707-A-1 and A-2, entitled "DATA SERVICE OPTIONS FOR SPREAD SPECTRUM SYSTEMS: CDMA2000 HIGH-SPEED PACKET DATA SERVICES," (Ballot Resolution Version 1999) and incorporated by reference, also define requirements for packet data transmission support on CDMA systems.

These IS-707.5 packet data services enable mobile users to use their laptop or palmtop computers (i.e., TE2 device 102) to receive and transmit packet data, thereby fully supporting Internet- and Intranet-networking connectivity. To wit, just as conventional users employ "wired" communication devices to able to electronically connect their desktop computers to land-based networks, mobile users can utilize wireless communication devices (i.e., MT2 device 104) to electronically connect and communicate with such networks.

In particular, the IS-707.5 standard specifies the packet data service options that may be used to communicate between the TE2 device 102 and IWF 108 via BS/MSC 106. In doing so, IS-707.5 introduces two protocol option models, which specify the packet data protocol requirements for the $R_m$ interface. FIG. 2 depicts one of the protocol option models, the Relay Layer Interface Protocol Option model 200, in which the application running on the TE2 device 102 manages the packet data services as well as the network addressing.

At the far left of FIG. 2 is a protocol stack, shown in conventional vertical format that depicts the protocol layers running on the TE2 device 102. At the top of the TE2 protocol stack lies the upper protocol layers, which includes the application layer 202. For mobile users utilizing packet data services to access the Internet and/or private Intranets, this layer 202 comprises, for example, web browser programs (e.g., Netscape Navigator™, Microsoft Internet Explorer™ etc.) and communications/networking applications (e.g., Microsoft Dial-Up Networking™).

The following protocol layer on the TE2 device 102 protocol stack is the transport layer protocol 204. As depicted in FIG. 2, this protocol 204 may be the Transmission Control Protocol (TCP). TCP is defined in Request for Comment 793 (RFC 793) entitled, "TRANSMISSION CONTROL PROTOCOL: DARPA INTERNET PROGRAM PROTOCOL SPECIFICATION", published in September 1981 and herein incorporated by reference. Essentially, TCP provides a reliable transport service to all applications by managing the assembly of messages coming from the TE2 device 102 into packets that are transmitted over the Internet.

The subsequent protocol layer is the network layer protocol 206. This protocol layer may include the Internet Protocol (IP), which is defined in Request for Comment 791 (RFC 791) entitled, "INTERNET PROTOCOL: DARPA INTERNET PROGRAM PROTOCOL SPECIFICATION", published in September 1981 and herein incorporated by reference. The IP protocol is the life-blood of the Internet as it handles the addressing and routing functionality for all Internet communications. It achieves this by affixing a 32-bit address to the header of packets, so as to ensure that the packets get to the right destination. Each intermediary node in the routing path checks the destination address to determine how to forward the IP packets.

The next layer protocol of the TE2 device 102 protocol stack is the link layer protocol 208. As indicated by FIG. 2, this layer may include the Point-to-Point Protocol (PPP) which is described in detail in Request for Comments 1661 (RFC 1661), entitled "THE POINT-TO-POINT PROTOCOL (PPP)", dated May 1992, and herein incorporated by reference. The PPP protocol is a link layer protocol used to configure, test, and establish the data link connection. The PPP protocol encodes packets coming from the upper protocol layers of the TE2 102 device and "serializes" then to facilitate transmission on the serial communications link.

Finally, FIG. 2 illustrates that the TE2 protocol stack is logically connected to the protocol stack of the MT2 device 104 over the $R_m$ interface through the relay layer protocol 210. The $R_m$ interface may comply, for example, with the TIA/EIA-232-F standard, entitled "INTERFACE BETWEEN DATA TERMINAL EQUIPMENT AND DATA CIRCUIT-TERMINATING EQUIPMENT EMPLOYING SERIAL BINARY DATA INTERCHANGE", published in October 1997 and herein incorporated by reference. Other $R_m$ interface standards may include, for example, the "UNIVERSAL SERIAL BUS (USB) SPECIFICATION, Revision 1.1", published in September 1998 and herein incorporated by reference.

As noted above, mobile users may utilize the packet data service options, as specified by the IS-707.5 standard, to access and communicate with the Internet or private Intranets. To do so, mobile users would employ a dial-up networking application, residing in the memory of TE2 device 102, such as Microsoft Dial-Up Networking™, for example. The dial-up application includes a user dial-up interface that enables users to identify the type of serial MT2 device 104 connected to the TE2 device 102 as well as accommodate the entry of telephone numbers and username/password scripts. The user dial-up interface generally incorporates a dial-up engine which receives the telephone number inputted by the user and generates MT2 device 104 an initialization string. The dial-up engine then translates the inputted telephone number into an AT dial command string that is compliant with the Hayes® Standard AT Command Set language and transmits the initialization string as well as the AT dial command string to the MT2 device 104. Examples of such AT dial command strings are: "ATDT 5551234" (for dialing telephone number 555-1234) or "ATI3" (for determining modem ID).

Typically, a dial-up networking application will not initiate the transfer of PPP packets from the TE2 device 102 to the MT2 device 104, via the $R_m$ interface, unless and until it receives confirmation that the MT2 device 104 has negotiated and established a connection across the $U_m$ interface. For example, for dial-up networking applications for TE2 devices 102 operating within a Windows® 95 environment, TE2 device 102 will only transmit PPP packets to the MT2 device 104 after it receives a "Connect" message, or the like, from MT2 device 104. Therefore, instead of automatically initiating a packet call upon detecting a PPP packet, TE2 device 102 has to wait until it receives the Connect message.

Moreover, other TE2 device 102 operating systems, such as Windows® 98 and Windows® NT, for example, further require a high Data Carrier Detect (DCD) signal which, pursuant to the TIA/EIA-232-F standard on the $R_m$ interface, is used to indicate that a channel carrier has been established. This high DCD signal requirement further complicates the transmission of PPP packets because, under the TIA/EIA IS-707-A.3 standard, a high DCD signal is only provided by the MT2 device 104 after a traffic channel has been established. Thus, for TE2 devices 102 operating in a Windows® 98 or Windows® NT environment, before the TE2 device 102 can begin transmitting PPP packets, a traffic channel has to be established, a high DCD signal level has to be provided to the MT2 device 104, and the MT2 device 104 must supply a "Connect" message back to the TE2 device 102.

Therefore, what is needed is a novel method that enables terminal devices to efficiently originate packet data service option calls via dial-up networking applications.

SUMMARY OF THE INVENTION

The present invention addresses the need identified above by providing a novel system and method that enables terminal devices to efficiently originate packet data service option calls via dial-up networking applications.

Systems and methods consistent with the principles of the present invention as embodied and broadly described herein include a terminal device for originating a call and for transmitting and receiving data in accordance with a selected data service option. The terminal device includes a dialing interface for inputting a sequence of one or more symbols representing a dial command string for originating the call. The input symbol sequence includes information indicating the selection of a data service option. The system also includes a communication device, coupled to the terminal device, for receiving the dial command string from the terminal device, for storing a plurality of pre-determined symbol sequences including standard telephone numbers and reserved telephone number sequences representing different data service options, and for comparing the contents of the dial command string with the stored pre-determined symbol sequences. The communications device operates in accordance with the selected data service option when the communication device determines that the contents of the dial command string matches one of the reserved telephone number sequences.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION OF THE PREFERRED EMBODIMENTS

The following detailed description of the embodiments of the present invention refers to the accompanying drawings that illustrate these. Other embodiments are possible and modifications may be made to the embodiments without departing from the spirit and scope of the invention.

Therefore, the following detailed description is not meant to limit the invention. Rather the scope of the invention is defined by the appended claims.

It will be apparent to one of ordinary skill in the art that an embodiment of the present invention, as described below, may be realized in a variety of implementations, including the software, firmware, and hardware of the entities illustrated in the figures (i.e., TE2 device 102, MT2 device 104, BS/MSC 106 and IWF 108). The actual software code or control hardware used to implement the present invention is not limiting of the present invention. Thus, the operation and behavior of the present invention will be described without specific reference to the actual software code or hardware components. Such non-specific references are acceptable because it is clearly understood that a person of ordinary skill in the art would be able to design software and control hardware to implement the embodiment of the present invention based on the description herein.

Figure 1:
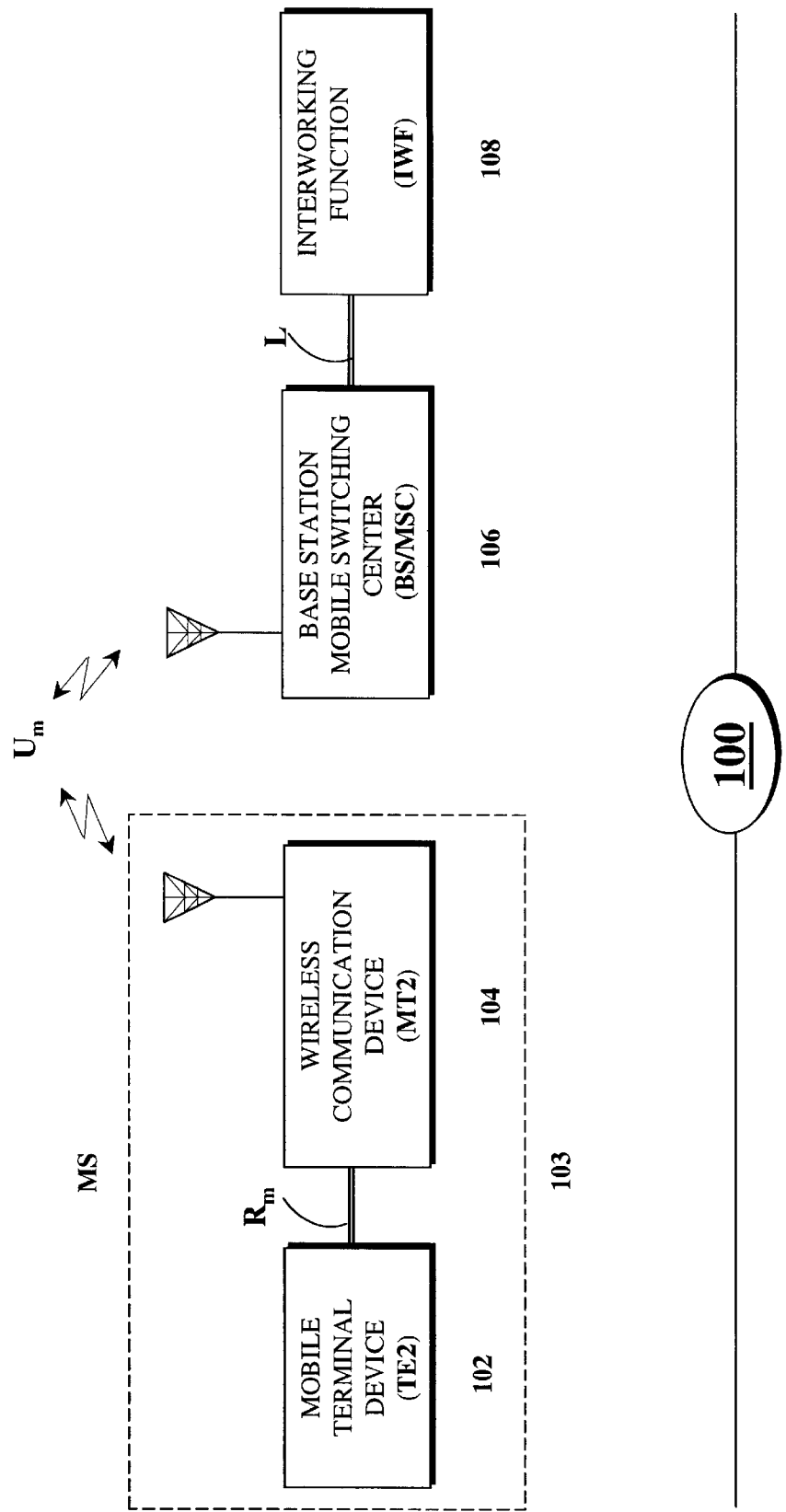
FIG. 1 is a high level block diagram depicting various elements of a wireless communication system.
Figure 2:
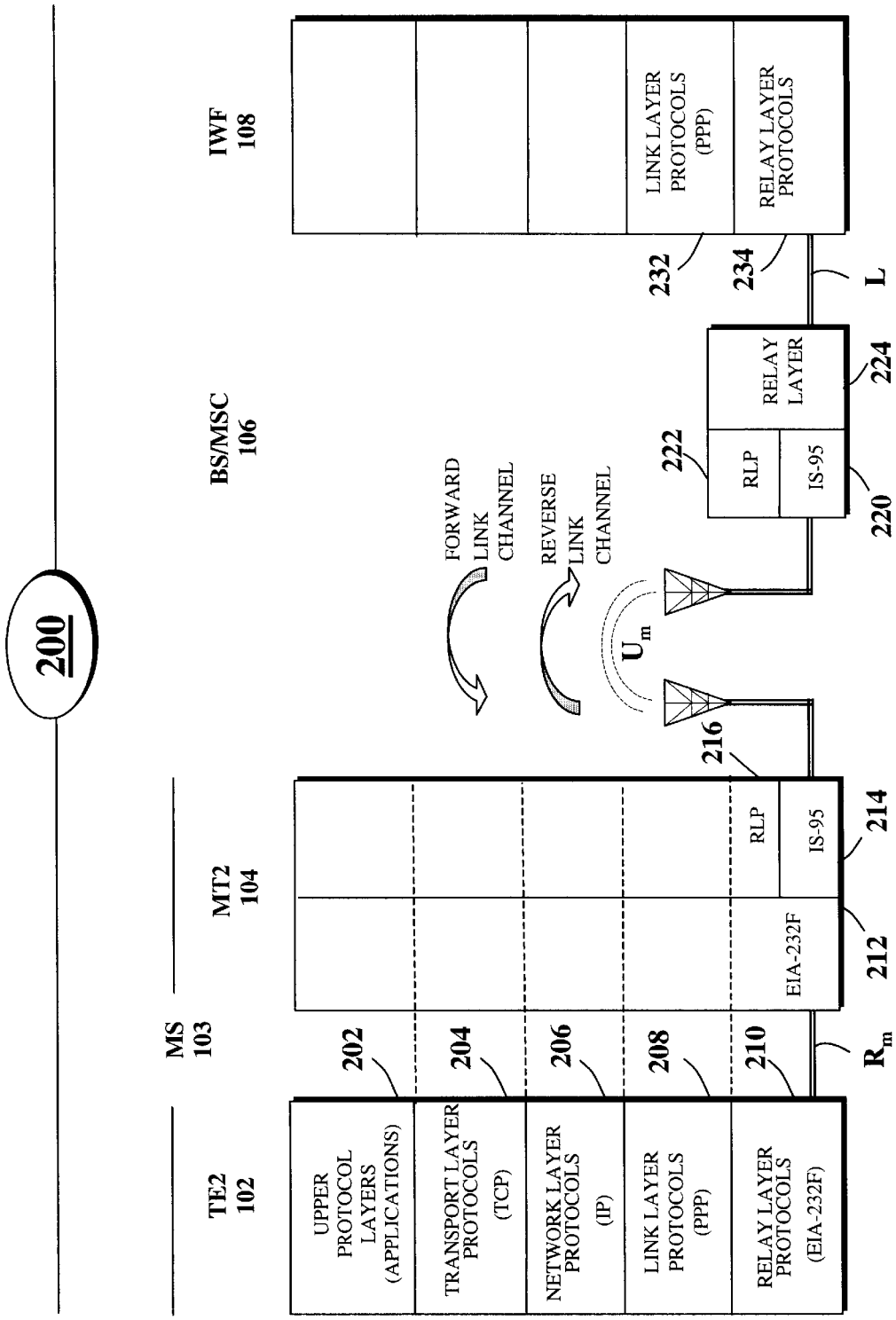
FIG. 2 schematically describes the protocol stacks of a wireless communication system.
Figure 3:
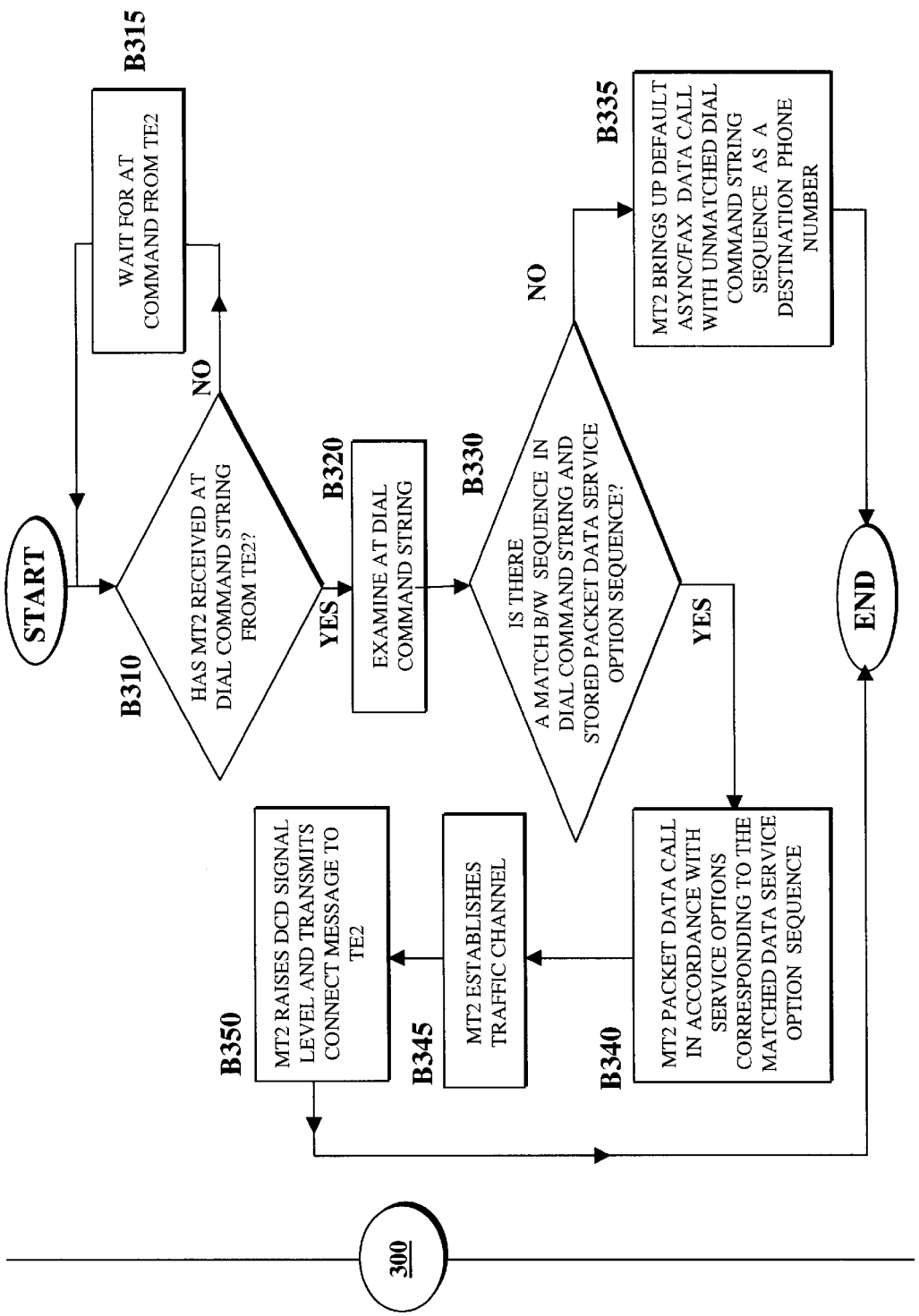
FIG. 3 is a flow-chart diagrams describing an embodiment of the invention.

FIG. 3 is a high-level flow diagram describing the operation of an embodiment of the present invention. The embodiment presumes that a mobile user endeavors to originate a packet call from the user dial-up interface of a dial-up networking application running on the TE2 device 102. The MT2 device 104 is capable of storing a plurality of alphanumeric sequences representing standard telephone numbers as well as packet data service options, which specify the attributes of the packet data call. To originate a packet data call, the user inputs an alphanumeric sequence, such as predetermined AT dial command string, in the user dial-up interface. The predetermined AT dial command string directly corresponds to a stored packet data service option. After the user inputs the AT dial command string, the TE2 device 102 formats and transmits the AT dial command string to the MT2 104 device.

As indicated in block B310, the MT2 device 104 first determines whether it has received an AT dial command string from the TE2 device 102. If not, the MT2 device 104 waits for the entry an AT command, as in block B315. If the MT2 device 104 has received an AT dial command string, the MT2 device 104 progresses to block B320.

In block B320, the MT2 device 104 examines the AT dial command string and extracts the alphanumeric sequence included therein. Subsequently, in block B330, the MT2 device 104 compares the alphanumeric sequence extracted from the AT dial command string to all of the stored alphanumeric sequences and determines whether there exists a match between the extracted alphanumeric sequence and one of the stored alphanumeric sequences. If a match does not exist, the MT2 device 104, in block B335, brings up an async/fax service data call, by default, as per the IS-707.4 standard. Accordingly, the MT2 device 104 uses the unmatched extracted alphanumeric sequence as a destination telephone number for the async/fax service data call. If a match does exist between the extracted alphanumeric sequence and one of the stored alphanumeric sequences, the MT2 device 104 progresses to block B340.

In block B340, the MT2 device 104 originates a packet data call in accordance with the particular packet data service options identified by the matched stored alphanumeric sequence. For example, in an exemplary embodiment, the stored alphanumeric sequence "ATDT#777" may be associated with a packet data call specified by service options 7, 15 or 4103 while stored sequence "ATDT#888" may be associated with a medium data rate (MDR) packet call having service options 22–25. Alternatively, a carrier may insert the special dial string and compare that special dial string to the one sent by the user to determine if a packet call is to be brought up.

In block B345, the MT2 device 104 establishes, as per IS-707.5, a traffic channel responsive to the packet data call origination of block B340. Once the traffic channel is established, the MT2 device 104 raises the DCD signal to a high level, as in block B350. In addition, the MT2 device 104 transmits a Connect message back to the TE2 device 102. As such, the receipt of the Connect message signals the communication application on the TE2 device 102 that the MT2 device 104 is ready and that a connection to the remote end has been established. Accordingly, the TE2 device 102 responds by commencing the transmission of PPP packets to the MT2 device 104.

By way of illustrating an embodiment of the present invention, suppose a mobile user, operating within a wireless communications network with CDMA data services support, wishes to establish a packet data call. The user originates the call by entering the alphanumeric character sequence "ATDT#777" into the dial-up interface of a networking application running on a mobile laptop. For this example, entering the character sequence "#777" is designated as a stored alphanumeric sequence signifying a particular CDMA packet data service option (e.g., service options 7 or 15). The wireless communication phone, coupled to the mobile laptop, examines the dialed AT dial command string coming from the laptop, extracts the alphanumeric sequence, and compares the extracted sequence, "#777" to the set of stored alphanumeric sequences. Upon detecting a match between the extracted "#777" sequence and the stored alphanumeric sequence, the wireless phone originates a packet data call consistent with the options specified in the stored alphanumeric sequence. The wireless phone then brings up a traffic channel, raises the level of the DCD signal, and supplies a Connect message to the laptop. This Connect message triggers the laptop to begin sending packets to the phone, thereby establishing the desired packet data call.

This embodiment, therefore, provides a method that enables terminal devices, such as laptops, for example, to efficiently originate packet data calls using dial-up networking applications with familiar dial-up interfaces. In this manner, mobile users do not need to have different interfaces and procedures for originating different types of packet data calls. The user only needs to acquaint himself with one user interface, and only remember the stored alphanumeric sequences (preferably having a telephone number format) to originate any packet data service option call. This system may store a plurality of alphanumeric sequences. Alternatively, the stored alphanumeric sequences could be predetermined by the carrier, or they could be configurable through the standard AT dial command set language or equivalent. Moreover, the stored alphanumeric sequences need not be limited to alphanumeric characters, but can take the form any symbol reproduced by a standard keyboard on a computer.

The processes associated with the presented embodiments may be stored in any storage device, such as, for example, non-volatile memory, an optical disk, magnetic tape, or magnetic disk. Furthermore, the processes may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by the system.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. Accordingly, the scope of the invention is defined by the claims and their equivalents.

What is claimed:

1. A method for originating a packet data service call in a wireless communication system having mobile data service support, said method comprising:

storing, in a memory, a plurality of predetermined symbol sequences representing a plurality of packet data service options and a plurality of standard telephone numbers;

inputting a sequence of one or more symbols into a terminal device, said sequence of one or more symbols representing a dial command string for originating said packet data call and includes information indicating a selection of a packet data service option, said terminal device capable transmitting and receiving data in accordance with said selected packet data service option;

receiving, on a communication device, said dial command string from said terminal device, said communication device being coupled to said terminal device and capable of sending signaling messages to said terminal device;

examining, in said communication device, contents of said received dial command string;

comparing, in said communication device, contents of said dial command string with said stored predetermined symbol sequences; and determining, in said communication device, a match between said contents of said dial command string and one of said stored predetermined symbol sequences, wherein said communication device originates a packet data call in accordance with said selected packet data service option when said communication device determines that said contents of said dial command string matches one of said stored packet data service options.

2. The method set forth in claim 1, wherein said communication device originates on one of an asynchronous data service and facsimile service call when said communication device determines that said dial command string contents does not match one of said stored packet data service options.

3. The method set forth in claim 2, wherein said communication device uses the unmatched dial command string contents as a destination telephone number to originate said one of asynchronous data service call and facsimile service call.

4. The method set forth in claim 3, wherein said selected data service option is determined by information included in said matched reserved telephone number sequence.

5. The method set forth in claim 4, wherein said input symbol sequence includes alpha-numeric characters.

6. The method set forth in claim 5, wherein said predetermined symbol sequences include alpha-numeric characters.

7. A computer-readable medium encoded with a plurality of processor-executable instruction sequences for:

storing, in a memory, a plurality of predetermined symbol sequences representing a plurality of packet data service options and a plurality of standard telephone numbers;

inputting a sequence of one or more symbols into a terminal device, said sequence of one or more symbols representing a dial command string for originating said packet data call and includes information indicating a selection of a packet data service option, said terminal device capable transmitting and receiving data in accordance with said selected packet data service option;

receiving, on a communication device, said dial command string from said terminal device, said communication device being coupled to said terminal device and capable of sending signaling messages to said terminal device;

examining, in said communication device, contents of said received dial command string;

comparing, in said communication device, contents of said dial command string with said stored predetermined symbol sequences; and determining, in said communication device, a match between said contents of said dial command string and one of said stored predetermined symbol sequences, wherein said communication device originates a packet data call in accordance with said selected packet data service option when said communication device determines that said contents of said dial command string matches one of said stored packet data service options.

8. The computer readable medium set forth in claim 7, wherein said communication device originates one of an asynchronous data service and facsimile service call when said communication device determines that said dial command string contents does not match one of said stored packet data service options.

9. The computer readable medium set forth in claim 8, wherein said communication device uses the unmatched dial command string contents as a destination telephone number to originate said one of asynchronous data service call and facsimile service call.

10. The computer readable medium set forth in claim 9, wherein said selected data service option is determined by information included in said matched reserved telephone number sequence.

11. The computer readable medium set forth in claim 10, wherein said input symbol sequence includes alpha-numeric characters.

12. The computer readable medium set forth in claim 11, wherein said predetermined symbol sequences include alpha-numeric characters.

* * * * *